US008868779B2

United States Patent
O'Neill et al.

(10) Patent No.: US 8,868,779 B2
(45) Date of Patent: Oct. 21, 2014

(54) METHOD AND APPARATUS TO ACCOMPLISH PEER-TO-PEER APPLICATION DATA ROUTING BETWEEN SERVICE CONSUMERS AND SERVICE PROVIDERS WITHIN A SERVICE ORIENTED ARCHITECTURE

(75) Inventors: Brian O'Neill, Pottstown, PA (US); James Stogdill, Wayne, PA (US)

(73) Assignee: Accenture Global Services Limited, Dublin (IE)

( * ) Notice: Subject to any disclaimer, the term of this patent is extended or adjusted under 35 U.S.C. 154(b) by 1026 days.

(21) Appl. No.: 10/867,916

(22) Filed: Jun. 15, 2004

(65) Prior Publication Data

US 2006/0047742 A1 Mar. 2, 2006

(51) Int. Cl.
G06F 15/16 (2006.01)
H04L 12/947 (2013.01)
H04L 29/08 (2006.01)

(52) U.S. Cl.
CPC ............ H04L 67/2819 (2013.01); H04L 49/25 (2013.01); H04L 67/1068 (2013.01); H04L 67/16 (2013.01); H04L 67/104 (2013.01); H04L 67/327 (2013.01)
USPC ............................ 709/238; 709/203; 709/242

(58) Field of Classification Search
CPC .................................................. H04L 67/2809
USPC .................. 709/211, 219, 224, 238, 203, 242
See application file for complete search history.

(56) References Cited

U.S. PATENT DOCUMENTS

| 5,341,477 | A * | 8/1994 | Pitkin et al. ................... 709/226 |
|---|---|---|---|
| 6,317,786 | B1 * | 11/2001 | Yamane et al. ............... 709/224 |
| 6,389,278 | B1 * | 5/2002 | Singh ......................... 455/414.3 |
| 6,735,771 | B1 | 5/2004 | Houlding |
| 7,188,155 | B2 * | 3/2007 | Flurry et al. .................. 709/219 |
| 7,254,614 | B2 * | 8/2007 | Mulligan et al. .............. 709/207 |
| 7,296,061 | B2 * | 11/2007 | Martinez et al. ............. 709/211 |
| 7,403,985 | B2 * | 7/2008 | Casati et al. .................. 709/223 |
| 7,792,973 | B2 * | 9/2010 | Gallant et al. ................ 709/228 |
| 2003/0074401 | A1 * | 4/2003 | Connell et al. ............... 709/203 |
| 2004/0111525 | A1 | 6/2004 | Berkland et al. |
| 2004/0215824 | A1 * | 10/2004 | Payrits ......................... 709/245 |
| 2004/0236633 | A1 * | 11/2004 | Knauerhase et al. .......... 705/26 |
| 2004/0260761 | A1 | 12/2004 | Leaute et al. |
| 2005/0044197 | A1 * | 2/2005 | Lai ............................... 709/223 |
| 2005/0080768 | A1 | 4/2005 | Zhang et al. |
| 2008/0086573 | A1 * | 4/2008 | Martinez et al. ............. 709/242 |
| 2008/0104258 | A1 | 5/2008 | O'Neill et al. |

OTHER PUBLICATIONS

S.J. Caughey et al., "*Metabroker: A Generic Broker for Electronic Commerce*," Technical Report 635, Department of Computing Science, University of Newcastle upon Tyne, Mar. 1998, pp. 1-13.

* cited by examiner

*Primary Examiner* — Andrew Georgandellis
(74) *Attorney, Agent, or Firm* — Fish & Richardson P.C.

(57) ABSTRACT

A Peer-to-Peer Application Data Routing Fabric is described. The Fabric provides routing between endpoints resident in peer nodes of a Service Oriented Architecture where the routing is based on endpoint presence, availability, status, and location to satisfy the requirements of fault tolerance and load balancing among homogenous endpoints; or routing by address among instances of differing type. In the preferred embodiment of the Fabric, the Session Initiation Protocol components, interactions and transport mechanisms are leveraged and extended.

44 Claims, 6 Drawing Sheets

METHOD AND APPARATUS TO ACCOMPLISH PEER-TO-PEER APPLICATION DATA ROUTING BETWEEN SERVICE CONSUMERS AND SERVICE PROVIDERS WITHIN A SERVICE ORIENTED ARCHITECTURE

BACKGROUND

1. Field of the Invention

This invention relates to routing data across computer networks. More specifically, this invention relates to data routing among distributed networks over the Internet. Still more particularly, this invention relates to distributed, fault-tolerant, load-balanced, managed application data routing among distributed application end points hosted within peer nodes of a service oriented architecture (SOA).

2. Background of the Related Art

With the advent of web services and the Web Services Interoperability (WS-I) family of specifications, mechanisms are evolving that support loosely coupled communication among families of disparate applications across a ubiquitous network.

Service oriented architectures have existed before in forms, such as Common Object Request Broker Architecture (CORBA) and Distributed Computing Environment (DCE), but they were limited by the necessity of tightly coupled interfaces and limited network reach. The service oriented architectures evolving from the WS-I specifications have the potential to have a much larger impact, because of their trans-enterprise scope, support for large-grain loosely coupled connections, and the ability to connect services exposed by loosely affiliated enterprises and organizations.

Most web services being deployed today are being implemented in a service oriented architecture defined by the specification trinity of Simple Object Access Protocol (SOAP), Web Services Definition Language (WSDL), and Universal Description, Discovery, and Integration (UDDI), with the Hypertext Transport Protocol (HTTP) as the primary transport mechanism. Unfortunately, this form of SOA is severely limited, owing to a combination of brokering and transport limitations. The basic SOA approach is described with reference to FIG. 1.

Referring to FIG. 1, UDDI 100 is a database of Service Providers. A Service Requestor 110 queries a UDDI repository to discover services of a particular type. However, after the consumer has discovered a service it must query the Service Provider 120 directly to discover the detailed requirements for communication with the service. Additionally, UDDI 100 is a store of persistent service registrations and has no knowledge of the current status of a Service Provider 120.

Services are registered in UDDI when they are deployed; there is no mechanism for updating those persistent registrations with transient status information. The consumer must take its chances that the service will be available when a request is made and will only discover that the service is unavailable when a fault occurs. The Web Services Distributed Management (WSDM) specification adds some support for historical statistics of a service's availability, but does not satisfy the core requirement to know the status right now, to support dynamic routing of requests to available service instances. There is no provision either in the UDDI specification or with the HTTP protocol discussed below for heartbeat or other availability monitoring, to obtain and disseminate up-to-date service status information.

SOAs based on UDDI also require that the Service Consumer communicate directly with the Service Provider. There is neither location nor instance opacity. The requesting application is directly bound to the Service Provider and must itself manage issues such as load distribution among multiple services of a particular type, fault tolerance, and intermittent availability.

Because the connections described above are inherently point-to-point with persistent bindings, it is not possible adequately to manage fault tolerance, request prioritization, service level agreements, and load distribution among multiple services of a given type because there is no central routing mechanism at the application layer. In practice, bindings are established at the time of design or implementation, and there is no effective mechanism to coordinate the efforts of multiple services of an equivalent type and context. All requests from a particular consumer go to the same provider even if that provider is overloaded or even if another instance of the provider is available elsewhere with low load. With this form of SOA every consumer would have to implement its own load balancing approach to partially resolve this problem.

To contend with the lack of dynamic routing and binding within the UDDI-based SOA model, services must be implemented as heavily managed horizontally scaled services "hidden" behind a single Uniform Resource Identifier (URI)/Uniform Resource Locator (URL) Proxy service. Behind that address, multiple instances of a single type may be deployed with load balancing, fault tolerance, and other management functions provided at the network layer. If in fact these services' instances are not owned or managed by the same organization and therefore cannot be organized behind a single URL or domain, this method will not work and routing at the application layer becomes necessary.

Perhaps an even larger limitation of SOAs of this form is imposed by the underlying transport mechanism, HTTP. HTTP is a synchronous request and response (client/server) protocol. It is rapidly becoming the de facto standard for the transport of application data associated with web services. Unfortunately, HTTP does not provide capabilities to support routing, registration, subscriptions, or events. While services can be deployed via this protocol, they will lack many benefits that could be provided by a protocol that offered those other capabilities.

Service implementations tend to conform to two models: Request/Response and Publish/Subscribe.

Request/Response services invoked via a message delivered by HTTP will have the disadvantage of requiring the consumer to synchronously wait for the response. This is a tremendous disadvantage, especially in cases where the service response takes more than a trivial amount of time to construct.

HTTP's synchronous nature and lack of timeout and retry mechanisms makes it less than ideal for Request/Response service interaction. However, its limitations are even greater for Publish/Subscribe or other event-driven service interactions. Because HTTP doesn't natively support NOTIFY, SUBSCRIBE, or INVITE interaction types, these methods must be built in an ad hoc manner on the synchronous HTTP POST interaction. In turn, this requires all Service Consumers who desire to participate in these interaction model types to run an HTTP server to receive those synchronous posts.

In summary, the shortcomings of a UDDI/HTTP based SOA include the following:

a) Service Provider Registrations are persistent and do not reflect the current availability or status of a particular instance.

b) A Service Consumer that discovers multiple Service Providers via this mechanism will have to choose one instance of a particular type with which it should transact and will have no means to accomplish effect fault tolerance, load balancing, or service level agreement (SLA) management.
c) Once a Service Consumer and Service Provider have forged such a "relationship," their interaction will continue even if another Service Provider instance is better able to satisfy the requests, unless the Service Consumer is programmed or otherwise equipped to carry out the complex task of identifying other Service Provider instances.
d) With no way to centralize knowledge about the instances of a Service Provider type, there is no way intelligently to manage load balancing and SLA management.
e) Load balancing must be accomplished at the Network Layer which assumes that all instances of a Service Provider can be located at a single virtual network address.
f) HTTP is a synchronous protocol and forces Service Consumers to block while awaiting a response.
g) HTTP does not automatically support Notifications, Subscriptions, Invitations, and other interaction types useful in a distributed application data routing environment, especially where support of Publish and Subscribe mechanisms is required.

The Session Initiation Protocol (SIP) is a telecommunications signaling protocol used to deliver services such as Voice over Internet Protocol (VoIP), and, when extended to be the SIP Instant Messaging and Presence Leveraging Extension (SIMPLE), instant messaging. SIP is used primarily in telecommunications and collaboration but offers many features that may be useful in the implementation of a Peer-to-Peer Application Data Routing Fabric.

SIP provides the following functions or message types:
REGISTER
INVITE
BYE
ACK
CANCEL These message types are used as signaling to establish asynchronous peer-to-peer sessions between mobile entities (e.g., a person whose VoIP presence may move from device to device as that person logs in to different computers), frequently to establish a phone call between two end points.

The SIP protocol also establishes specifications for the Registrar and Proxy devices that handle the actual routing of messages. Messages are addressed in the form "SIP: jim@camden.com" where "jim" is the entity name and "camden.com" is the entity's home domain (and location of the controlling SIP Proxy).

SIMPLE adds the following functions and message types:
SUBSCRIBE
NOTIFY
MESSAGE

SIP also adds the specification for a Presence server that manages subscriptions and distributes notifications in response to subscriptions.

A SOA that leveraged the SIP and SIMPLE standards and associated protocols would offer a number of advantages over one based solely on UDDI and HTTP. The combination of transient status management, additional interaction types, and the asynchronous transport supported by these protocols may satisfy a number of the issues raised above. However, SIP and SIMPLE in their current forms still have the following shortcomings:
a) SIP doesn't support the idea of "equivalent" entities or end points. SIP is instead oriented around collaboration facilitation where the end points are usually humans who are not interchangeable the way multiple instances of an application may be.
b) SIP doesn't natively support efficient application data routing by service type. SIP addresses always include the domain and, by implication, an entity instance.
c) SIP does support forking of messages to one or more instances of an entity (usually to ensure that a user logged into multiple devices will receive a message), but doesn't natively apply rules (e.g., load balancing or fault tolerance) to dynamically route to a single instance of the invoked entity.
d) SIMPLE provides a MESSAGE interaction, but that interaction does not natively support remote service invocation by implementing protocols in the message payload, such as SOAP.
e) SIP provides support for routing to an entity known by its primary domain, even if that entity is currently residing on a device in a remote domain. However, SIP does not have a native capability to discover dynamically an entity whose home domain is remote, unless that domain name is included in the invocation address.
f) The SIP heartbeat provides a mechanism to notify the SIP Registrar, Proxy, and Presence servers that an entity is no longer available; however, it does not natively carry as a payload additional end point status information that would be critical to the support of SLA, quality of service (QoS), and load balancing management.
g) SIP messages support "end point priority" content but that content is insufficient to support SLA, QoS, and load balancing Management.
h) The preponderance of services and Service Consumers deployed today are not SIP end points but must be participants in an effective SOA. SIP does not natively enable invocation of SIP-based end points via protocols other than SIP.
i) The SIP protocol assumes that an "inviting" end point knows the address of the "invited" end point, and so does not make provisions for dynamic discovery of end points by type or other attribute. SIP makes no provision for the utilization of UDDI to support discovery.

OBJECTS AND ADVANTAGES

To overcome the limitations and disadvantages of the prior art, it is the object of the present invention to provide the following advantages:
a) to add the following interaction types to the core transport layer of the SOA framework to support asynchronous, event-driven peer-to-peer interactions between Service Consumers and Service Providers:
a. REGISTER
b. INVITE
c. BYE
d. ACK
e. CANCEL
f. SUBSCRIBE
g. NOTIFY
h. MESSAGE
b) to provide for the acquisition, storage, and subsequent dissemination of transient service registration and status information,
c) to support opaque bindings between Service Consumers and Service Providers,
d) to provide Application Data Routing between service end points to support service level agreements satisfying load distribution among services of the same type within the SOA framework without making it necessary for the Service Consumers to manage the load distribution e) to provide Application Data Routing between service end points to support distributed fault tolerance for services of same type within the SOA framework without making it necessary for the Service Consumer to manage the fault tolerance when services are subject to intermittent availability f) to provide support for dynamic prioritization of requests to multiple instances of services of a type g) to natively support asynchronous communications to improve on the SOA's ability to support publish and subscribe information exchanges

BRIEF SUMMARY OF THE INVENTION

The system and methods of the present invention comprise an application of telecommunications concepts and protocols to the domain of enterprise application architecture and development. Specifically, the system and methods of the present invention enhance web services brokering by augmenting the WS-I standards to incorporate transient status registrations; asynchronous, event-driven peer-to-peer application data routing; invocation by service type and instance; and a number of additional interaction types to provide native support for advanced capabilities such as publish and subscribe. To this end, the system and methods of the present invention adapt and extend the components and protocols of the SIP standards family to application data routing. Combined, the components of this invention will facilitate deployment of a robust Service Oriented Architecture that can support distributed service level agreement and quality of service management, distributed fault tolerance, and delivery of services from application environments that are not themselves inherently fault tolerant.

DETAILED DESCRIPTION

The system and methods of the present invention extend the concept of service oriented architecture to include mechanisms for transient status and availability management, dynamic application data routing to support distributed fault tolerance and load balancing, and invocation protocol independence.

The system and methods of the present invention comprise a multi-protocol Service Broker and distributed routing fabric which comprise the following major components, interaction types, and capabilities:

Components:
Public Persistent Registry
Private Persistent Registry
Proxy
Binding Manager
Routing Engine
Service Status and Availability Manager
Service Status Subscription Manager
Multi-Protocol Peer-to-Peer Application Data Routing Fabric
Fabric Connector
Component Interactions
Transient Service Registration
Service Access Point Discovery
Service Instance Discovery
Service Invocation
Provisional Response
Invocation Response
Timeout
Status Heartbeat
Status Subscription
Status Notification
Registration Expiration
Capabilities
Application Data Routing:
  By service type
    One of a type
    All of a type
  By service instance
  Binding and Routing Flexibility/Optimized Routing
Distributed Fault Tolerance
Distributed Load Balancing
Invocation Prioritization
Distributed Service Level Agreement Management The system and methods of the present invention will be more fully understood by the following detailed description of the function of each component to support the named interactions and capabilities in an embodiment of the present invention.

Components:

The heart of the Peer-to-Peer Asynchronous Application Data Routing Fabric is the Service Broker. The Service Broker at each node maintains a list of all services in its own domain and their status, and, if relevant, the access point and status of services hosted at remote nodes. Relevant services at remote nodes are those services that have been requested by local Service Consumers or that may be.

The Public Persistent Registry is a repository of Service Access Points for Service Providers managed within the fabric (i.e., hosted in or managed by a peer node in the fabric). It is used by Service Consumers not directly connected to the routing fabric, as a means of locating an entry point into the routing fabric for a particular type of Service Provider.

The Private Persistent Registry is internal to the fabric and is used to discover node locations that provide a particular type of Service Provider.

Persistent Registries may take the form of a UDDI registry but other kinds of registries may be used as long as they can meet the basic requirements of maintaining persistent registrations and pointers to detailed invocation contracts (e.g., WSDL specifications).

Figure 1:
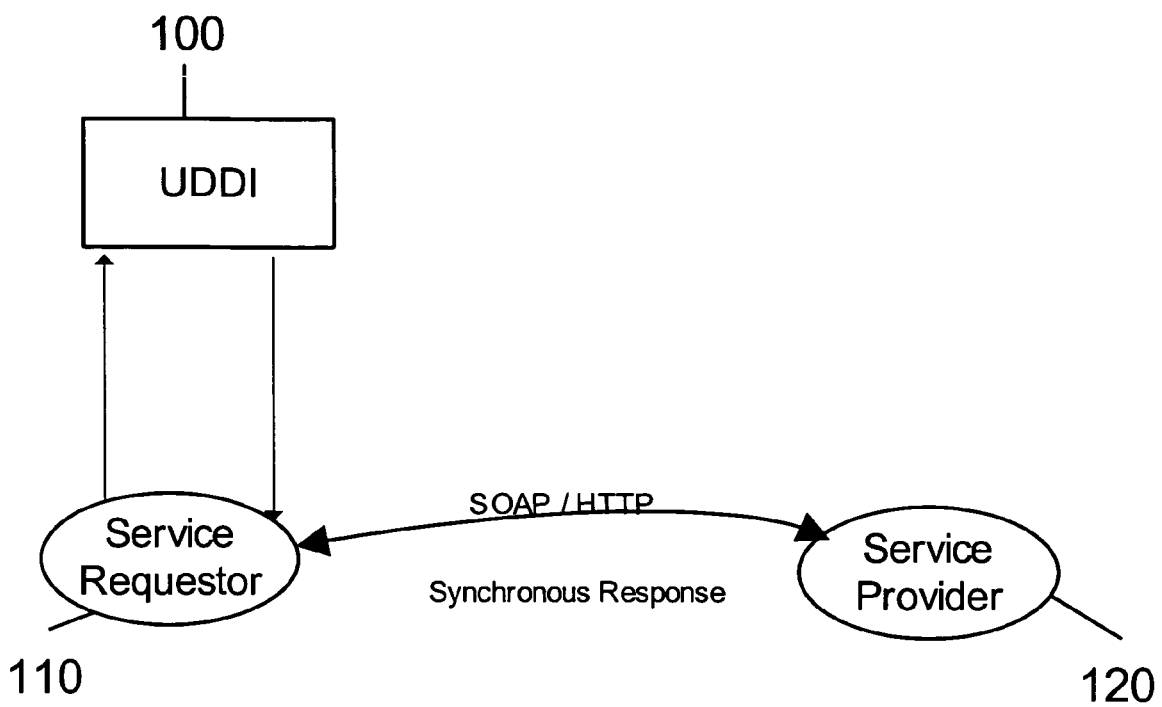
FIG. 1 shows a conventional SOAP/UDDI/WSDL/HTTP SOA of the Prior Art.
Figure 2:
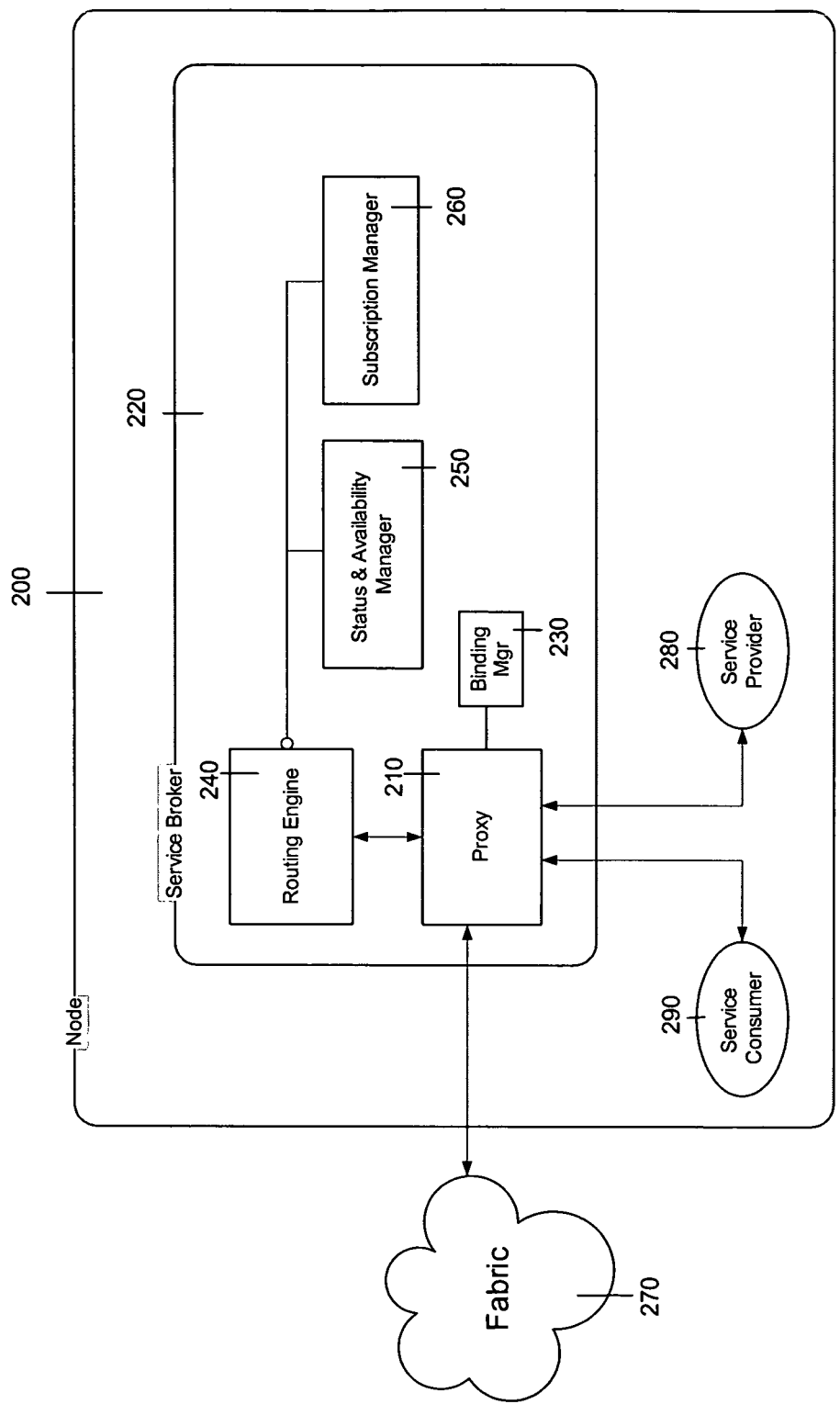
FIG. 2 shows a the detail of a single Service Broker node.

The Service Broker consists of the following components: Proxy, Binding Manager, Routing Engine, Service Status and Availability Manager, Service Status Subscription Manager, and Multi-Protocol Peer-to-Peer Application Data Routing Fabric. FIG. 2 shows the components of a Service Broker node in relation to each other.

Referring to FIG. 2, in Service Broker Node 200 the Proxy 210 serves as an address translator and is the core component of the Service Broker 220. Proxy 210 receives messages intended for some service end point, and, based on the contents of the Binding Manager 230 or input from the Routing Engine 240, swaps the message headers to replace interim address information with final destination address information. It is this translation performed by Proxy 210 that enables invocation by type rather than by instance, as the interim address may only include a Service Provider Type name and may not specify a particular instance.

The Binding Manager 230 is a subcomponent of the Proxy 210 and manages a table of Service Provider bindings in order of preference as defined by the Routing Engine 240. Depending on the routing regime in effect for a particular service type (e.g., sticky, round robin, or other routing strategy), the Proxy 210 will utilize the Binding Manager 230 to determine the best instance of a service type to satisfy a particular invocation request.

The Routing Engine 240 is home to the routing intelligence that supports Distributed Fault Tolerance, Distributed Load Balancing, and Service Level Agreement Management. It takes inputs from the Status and Availability Manager 250 to provide routing instructions to the Proxy, 210 either in the form of a preferenced or weighted Binding Table or on a message by message basis. It also establishes the routing regime in effect for a particular Service Provider Type.

The Status and Availability Manager 250 serves as a transient repository of registration information and associated near-real-time end point statuses. It receives registration events and heartbeats and manages timeouts to determine which Service Provider 280 is currently available, where they are located (from the perspective of that node), and more detailed status (e.g., current load) for input into the routing decision process. It will harvest status information from local Service Provider heartbeat registrations and from the invocation responses from remote nodes (status information will be included in message "trailers"). It will also establish subscriptions with Service Status Subscription Managers in remote nodes where a local Service Consumer 290 may make invocations.

The Service Status Subscription Manager 260 receives subscription requests from Service Status and Availability Managers at remote nodes (not shown) and then, as needed, forwards local Service Provider status messages to those interested remote nodes to serve as inputs to their routing decisions.

Figure 3:
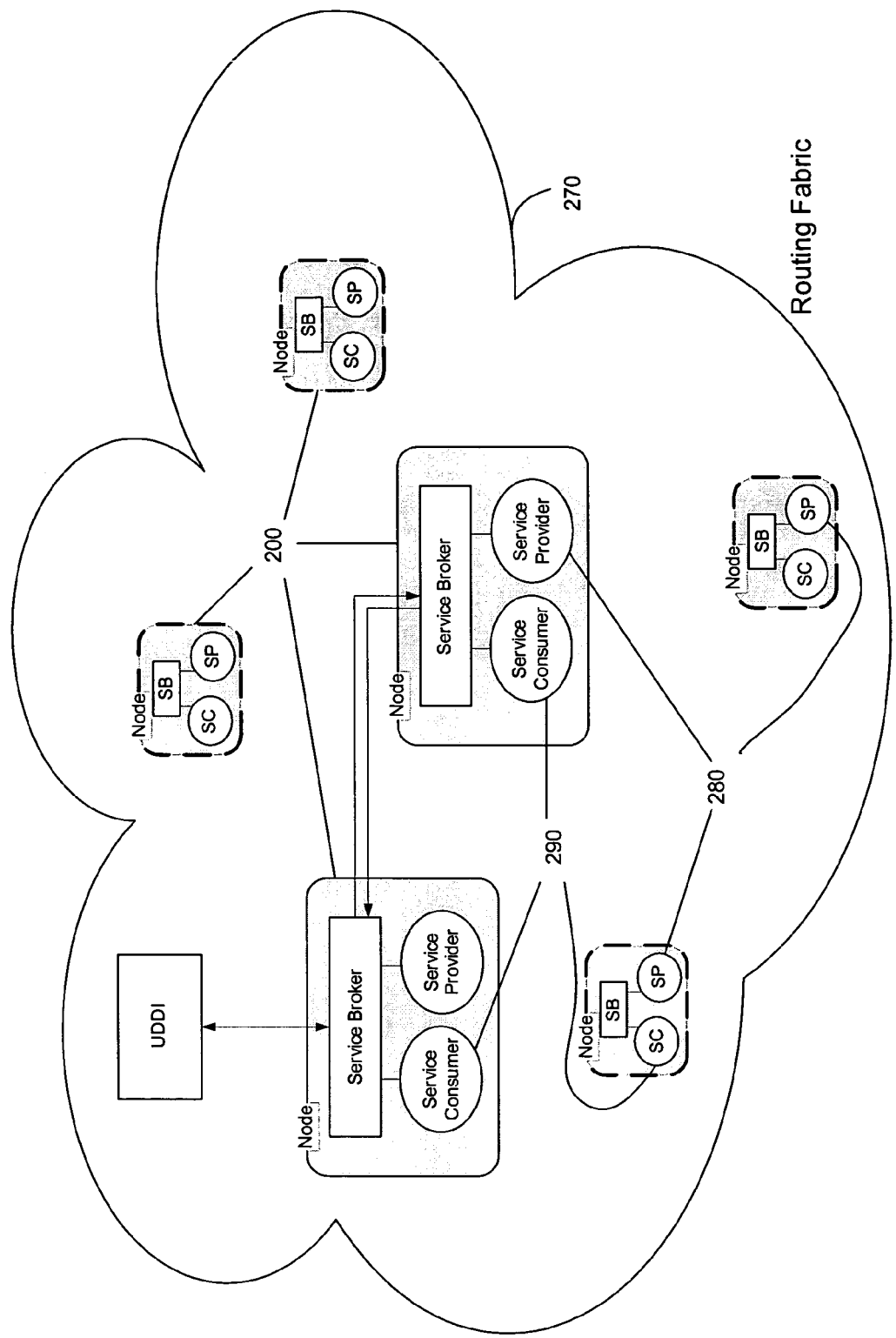
FIG. 3 shows peer-to-peer interaction between multiple Service Broker nodes.
Figure 4:
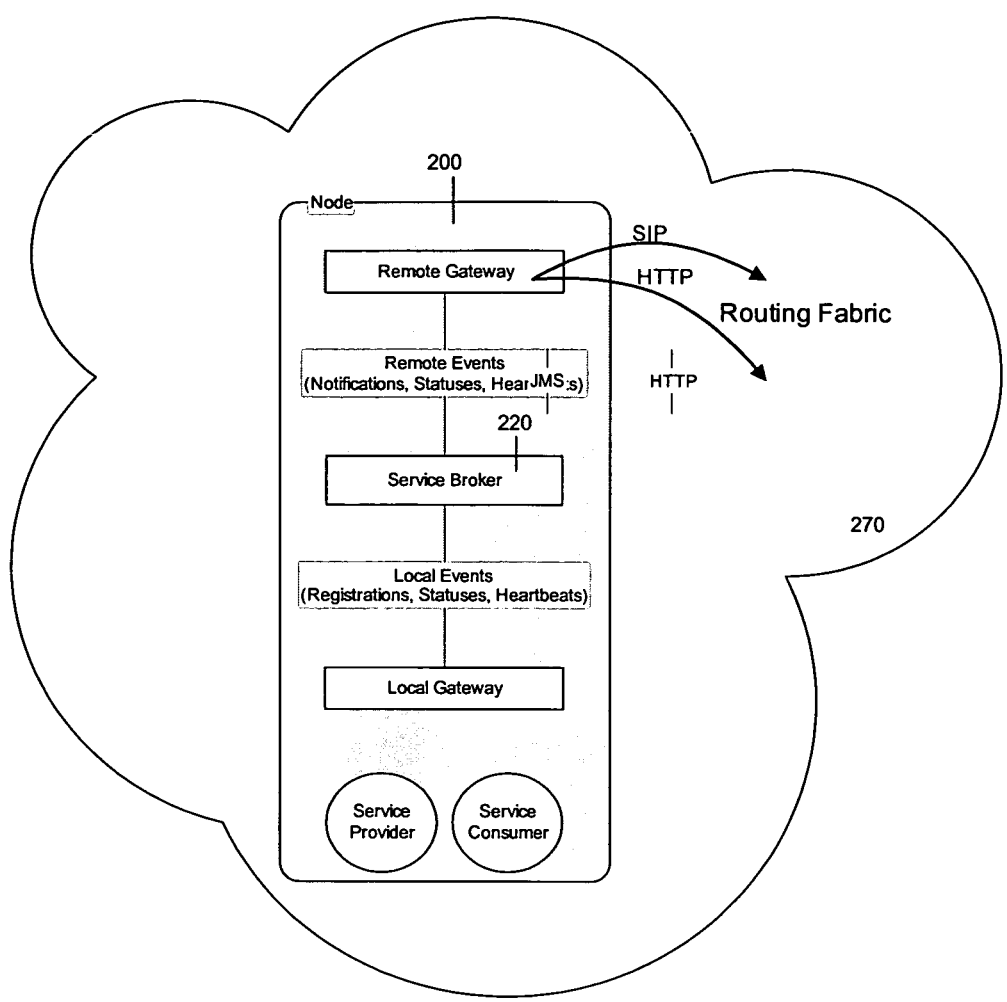
FIG. 4 shows a detail view of a Service Broker node's Routing Fabric.

Referring to FIG. 3, the Peer-to-Peer Application Data Routing Fabric 270 is a multi-protocol set of asynchronous communication channels that enable message delivery between multiple Service Broker Nodes 200. Typically these channels will enable communication across the Wide Area Network connections that are likely to include separate nodes. The system and methods of the present invention provide SIP as an asynchronous transport and HTTP as a synchronous transport that has been buffered to appear to be asynchronous, and may be extended to add additional transports. The methods by which a Service Broker 220 at one Service Broker Node 200 may communicate with other nodes via SIP or HTTP, depending on the remote node's capabilities or preferences, are shown graphically in FIG. 4.

Further identifying the system and methods of an embodiment of the present invention, the Fabric Connector is an optional set of components that may be integrated into participating Service Providers and Service Consumers. A Participating end point is one which interacts with the Fabric via the Fabric's native communication protocols and which includes the Fabric Connector and is thus able to satisfy the Fabric's requirements related to registration, heartbeat, timeouts, etc. The Fabric Connector will also include a Distributed Binding Cache which will permit that end point to communicate directly with other end points while bypassing the Service Broker. The purpose of this is to permit optimized ongoing conversations while eliminating the need for the end point itself to manage bindings directly.

Interactions:

Transient Service Registration is the interaction between a Service Provider and the Service Broker that results in a new entry in the Service Status and Availability Manager. Whenever a participating Service Provider is started it must register with the Service Broker.

Service Access Point Discovery is an interaction between a Service Consumer and the Persistent Registry. The Service Consumer is requesting the network location of an access point for a service by type or by instance that will provide managed access to the Service Provider. In the simplest case, a list of all available Service Access Points applicable to a particular Service Type will be returned. A more advanced interaction might have Service Access Points returned in a rank order list by "topological proximity."

Service Instance Discovery is an interaction between a Service Broker within the Fabric and the Persistent Registry. The Service Broker, which has received an invocation request for a Service Provider by type, interacts with the Persistent Registry to find instances of that Service Provider type within the Fabric.

Service Invocation is an interaction between a Service Consumer and a Service Provider transacted via the Service Broker. The Service Consumer makes its request via the Service Broker to maintain location opacity for the Service Provider and so that distributed fault tolerance, load balancing, and service level agreements may be managed by the Service Broker.

Provisional Responses are interactions between a Service Provider and Service Consumer that indicates to the Service Consumer that the Service Provider is in the process of satisfying the request.

A timeout is an interaction in which an expected action or response has not occurred within the expected period of time. It may be a reaction to a delayed invocation response or a failed heartbeat.

An Invocation Response is an interaction between a Service Provider and Service Consumer by which the Provider responds to the request in the form of one or more messages.

A Status Heartbeat is an interaction between a Service Provider and the Service Broker by which the Service Provider indicates "presence" and status to the Service Status and Availability Manager. A Service Provider that has registered with the Service Broker must periodically indicate by heartbeat that it is "still alive."

A Status Subscription is an interaction between two Service Brokers by which one Service Broker indicates to the other that it is interested in the status and availability of a specific Service Provider type hosted by the other.

A Status Notification is an interaction between two Service Brokers where one, in response to the other's Status Subscription, provides Service Provider status information to the other.

A Registration Expiration is an action taken by a Service Broker to expire the registration of a Service Provider for which it is host if the timeout and heartbeat requirements haven't been met. It may also take the form of an interaction between Service Brokers if a remote Service Broker has a Status Subscription for that type of Service Provider. The Service Broker expiring a Service Provider's Registration must inform subscribing Service Brokers of the expiration.

Capabilities:

Application Data Routing

A core capability of the invention is Application Data Routing between Service Consumers and Service Providers by Service Provider Type. Existing Service Oriented Architectures require that Service Consumers be aware of the Service Provider's location and make invocation requests of a specific remote instance. The invention will permit Service Consumers to make invocation requests to the Fabric by Service Type without foreknowledge of which instance of that Service Type will satisfy the request; the invention thus implements location opacity.

Service Invocations by Type can take two forms: 1) Invoke "an" instance of a Service of this Type and 2) Invoke "all" instances of a Service of this Type.

The invention also supports the more conventional capability of Service Invocation by Instance (i.e., location-transparent invocation) to support cases where only a specific Service Provider instance is desired (e.g., a non-initial invocation of a Service Provider that maintains state).

Application Data Routing takes two forms within the invention. The primary form of Application Data Routing addresses which of a group of functionally identical Service Provider Instances should receive a particular request in order to satisfy the requirements of fault tolerance, load balancing, and service level agreements.

A subordinate form of Application Data Routing is identifying the exact path between two end points that a request and response may take. Fundamentally, this refers to whether or not the path includes the Service Broker or whether the route is permitted to be optimized and take a more direct route between end points equipped with distributed binding caches.

A capability of the invention is to support Route Flexibility and Optimized Routing by permitting some invocations and responses to take a direct route between end points. Location opacity is maintained through the use of distributed binding cache Service Broker components.

Distributed Fault Tolerance

When multiple instances of a Service Provider Type exist within the Fabric, the invention will monitor the health of each instance of such a Type. In the event that an instance fails, the Fabric will satisfy requests to Service Providers of that Type with the other available instances without requiring the Service Consumer to be aware of the failure or to compensate for it.

Distributed Load Balancing

When multiple instances of a Service Provider Type exist within the Fabric, the invention will serve as a framework for distributing request load evenly among the instances of the type within the Fabric. It will use the information resident in the Status and Availability Manager and routing algorithms in the Routing Engine to generate a "preferenced" binding table and/or individual routing decisions based on round robin, sticky routing, and other routing regimes.

Invocation Prioritization

Service Consumers or request types will have inherently different priorities from the point of view of a particular Service Provider Type. The invention will facilitate the prioritization of requests such that higher priority requests will be more effectively served by the available Service Providers.

Distributed Service Level Agreement Management

A distributed collection of Service Provider Instances of a particular Type may be required to provide a collective Service Level Agreement. The invention will serve as a framework for distributing requests among instances of a Service Type such that latency and other SLA requirements are met.

DETAILED DESCRIPTION—PREFERRED EMBODIMENT

The preferred design approach for implementation of the components, interactions, and capabilities described above with respect to an embodiment of the present invention leverages the Session Initiation Protocol and related specifications to provide core functions and then extend the Session Initiation Protocol in implementation to add additional capabilities.

In the preferred embodiment, the Proxy component may be based on a SIP Proxy Server and is developed such that it satisfies the SIP specification for a Proxy while extending the capability of the Proxy Server beyond the SIP specification in four fundamental ways:

a) The Proxy Server of the preferred embodiment is enhanced to interact with non-SIP-transport message channels within the local node to permit non-SIP-enabled endpoints to participate.

b) The Proxy Server of the preferred embodiment is modified to incorporate the Binding Manager/Binding Table, including logic to select the appropriate binding from the Binding Manager to enable end point routing by type.

c) The Proxy Server of the preferred embodiment is modified to allow interaction with remote nodes by both SIP and HTTP remote channels to permit inter-node communication to occur with synchronous or asynchronous protocols as required.

d) The Proxy Server of the preferred embodiment is extended to incorporate a modular Routing Engine to build the Binding Table and to make on-the-fly routing decisions to facilitate end point routing by type that provides fault tolerance, SLA management, and load balancing.

A SIP Proxy Server is designed to forward messages that have been addressed to a particular entity instance. In the preferred embodiment, the system and methods of the present invention modify the basic SIP Proxy to support intelligent routing by Service Provider Type and to support transport protocols other than SIP.

Most service invocations will not originate with SIP as their transport. Enhancement (a) permits the core SIP-based Proxy to provide routing instructions to these messages whether they are to be routed to another point within the local node or to a remote Service Provider. Protocols may include HTTP, JMS, or others.

Enhancement (b) supports high performance routing to more than one possible end point or entity. A standard SIP Proxy is designed to forward a message to a known entity (instance) at an unknown location. This modification enables the Proxy to forward a message to an dynamically selected equivalent entity resident on one of many known devices.

Enhancement (c) provides a distributed routing fabric that can leverage the value added capabilities of SIP as a transport when possible, but will be capable of leveraging HTTP as its inter-node transport when required. This enhancement involves adding a buffer around HTTP to give the channel the appearance of being asynchronous despite the synchronous transport protocol. It also involves adding the capability to support timeouts, provisional responses, and other interaction types that SIP provides as a standard.

SIP as a transport offers the advantages of built in provisional responses, timeouts, asynchronous interaction, and others; but as an asynchronous transport protocol, SIP can be limited by existing firewalls and related security apparatus. A less capable, but workable, HTTP-based option will be required in such a situation.

Enhancement (d) is required because the Proxy's routing decisions will follow rules that depend on inputs such as the status of each instance. It is thus necessary to provide a mechanism for running these routing rules either in reaction to events (e.g., updating a status) or in response to a single invocation. The goal is to allow the Proxy to do most routing with a simple table lookup where the table has been proactively populated by the Routing Engine in response to a status change. The Routing Engine will only interact at invocation time with the Proxy when required by the routing regime.

The Status and Availability Manager may be based on a SIP Registrar and should be developed in such a way that it satisfies the SIP specification for a Registrar while extending it. The fundamental way that the Status and Availability Manager extends on the SIP Registrar is by the addition of status management.

The basic SIP Registrar keeps track of entity registrations and will expire a registration whose heartbeat requirements are not met. However it does not manage status on those entities (such as load and other factors that the Routing Engine will require). The modifications to the SIP Registrar will permit it to accept registration notifications from non-SIP end points, maintain extensive status on those end points, and share that status with the Routing Engine and Subscription Manager as required.

In the preferred embodiment, the Subscription Manager may be based on a SIP/SIMPLE Presence Server and further satisfies the SIMPLE specification for a Presence Server while extending its capabilities beyond those of the SIMPLE specification. The fundamental extension of the SIMPLE Presence Server is to support subscriptions from other nodes to provide status information on local Service Providers.

OPERATION OF INVENTION

The ultimate purpose of the invention is to effectively route requests from Service Consumers to Service Providers. To successfully achieve this goal, the infrastructure must facilitate a set of operations and interactions between the components described in the preferred embodiment.

To support a Service Provider, the invention must provide a mechanism for the provider to describe its service to consumers, publish that information for retrieval by consumers, and register an available instance when it comes online.

These state of the art is greatly enhanced by the way these operations are facilitated with the invention.

Supported Operations of a Service Provider:

| Operation | Prior Art | Invention |
|---|---|---|
| Describe | WSDL describing both the interface and the actual binding to an existent instance. | WSDL describing only the interface, sufficiently descriptive to allow discovery services of the same type. |
| Publish | Often, none at all. Sometimes, UDDI mechanism through which an instance of a Service Provider identifies its interface and exact location without regard to availability or status. | Persistent Registry (e.g., UDDI) mechanism through which a Service Provider describes its interface and a possible node for availability without specifying an exact location. |

-continued

| Operation | Prior Art | Invention |
|---|---|---|
| Status & Availability | No mechanism, with the exception of the WSDM specification; but WSDM requires the consumer to know the location of the provider and query for status directly and focuses on historical performance rather than current status. | Status and availability are discovered at run time via the intelligent routing capabilities of the fabric. Status information is then proactively disseminated to interested parties. |

The system and methods of the present invention are independent of the means by which a provider describes its service, though in the preferred embodiment, it does require that this description be consistent across like services when stored in the Persistent Registry. A Service Broker must be able to query the Persistent Registry by type to discover other nodes that might provide the requested services.

The invention assumes that a provider has used the means described above to describe and publish information to other consumers. The provider's description (e.g., WSDL specification) is entered into a persistent registry (e.g., UDDI), specifying not locations but rather nodes (domains) where the service may be available.

Where the system and methods of the present invention start to play an active role in the life cycle of a Service Provider is when an actual instance of that service comes on line. When a service is started, it registers with its local Service Broker's Status and Availability Manager. This is a direct interaction between the Service Broker and the Service Provider which causes and entry to be made into service status table, which is maintained by the Service Status and Availability Manager.

Registrations have a time-to-live. A Service Provider is responsible for refreshing its registration. Expired registrations are removed. Once the registration is removed the service is no longer available. This functions as a heartbeating mechanism. Registrations are also removed for services that fail to respond to an invocation request.

Once registered a Service Provider is available for invocation by Service Consumers.

To support a Service Consumer, the system and methods of the present invention provide a mechanism for the consumer to discover the provider by type, instantiate a client capable of invoking that service, discover an available instance of that service, bind to that instance, and actually invoke the service.

Supported Operations of the Service Consumer:

| Operation | Prior Art | Invention |
|---|---|---|
| Discover Type | UDDI query resulting in a WSDL that is directly tied to an instance of the service. Or, in cases where UDDI has not been used, discovery may occur manually at design time by the developers. | Persistent Registry query resulting in only a specification of the service, not bound to any instance or even access point. |
| Instantiate (Find an Instance) | Using a tool to auto-generate a client from the WSDL that is "hard-coded" (statically bound) to the instance specified in the WSDL. | Using a similar tool to generate a client that adheres to the description specified in the WSDL, but that incorporates logic to dynamically retrieve peer-nodes (based on context) at run time. |
| Discover Instance | Since the client is already bound to an instance, acquisition of a particular instance has already happened. If anything, DNS | At run time, the routing fabric can perform the discovery of an instance on behalf of the consumer. The routing fabric routes the request to the |

-continued

| Operation | Prior Art | Invention |
| --- | --- | --- |
| | provides some resolution capabilities, linking the URL indicated in the WSDL to a particular internet address, but DNS does not quickly propagate changes. | specified node (discovered dynamically). Then, given the service name and request, the node delivers the request to a particular instance. |
| Bind | Again, the binding is a permanent one, decided at design time when the client is instantiated. | In the invention, the binding can be static or dynamic, and this choice can be made at any point in the invocation chain. Once an initial response is received, a consumer can subsequently choose to directly invoke the instance or to route requests through the fabric. |
| Invoke | Invocations are made in a straightforward fashion, using the instance to which the consumer was bound. | Invocations are routed through Service Brokers where they can provide fault tolerance and take into account status information for available/known consumers. |

According to the preferred embodiment, the present invention is directly involved in nearly all aspects of a Service Consumer's operations, excepting instantation. Provided a consumer has generated a client capable of invoking the required service, the invocation then follows the following workflow.

The invocation is initiated by the Service Consumer and usually will be received through a service access point. The consumer's client discovered the service access point by interacting with the persistent registry and querying by service type.

Once the Service Consumer discovers the service access point, it can then invoke the service by type by sending a request to the service access point. At this point, the target address of the invocation is abstract specifying the next destination as "type@sap", where the access point was discovered via the Persistent Public Registry, and the type was known by the consumer.

In the preferred embodiment, the service access point may act as a gateway for the request because the request may not be in a Fabric-native protocol. Regardless, each service access point is associated with a node, which implies that each service access point is associated with a Service Broker. The inbound request is routed directly to the Service Broker.

Within the Service Broker the invocation operation decomposes into a set of smaller interactions between its subcomponents The invocation is first received by the Proxy. The Proxy consults the Binding Manager. The Binding Manager manages a set of bindings and routing regimes. A binding links a service type to a node. If the Binding Manager already has one or more bindings and a regime, that regime is applied to the set of bindings and a route is chosen. The Proxy then forwards the request on to its destination. At this point, the target address is "nodal" specifying the next destination as "type@node", where the node was discovered via the Binding Manager.

If the Binding Manager does not have any bindings for the invocation type, it then instructs the Service Status and Availability Manager to research that service type in order to gather information about nodes that may provide the service. Status and Availability Manager interacts with the Persistent Private Registry to attain a list of nodes that maintain Service Providers of the requested type.

Further in the preferred embodiment, the Status and Availability Manager may then gather the status information for the relevant nodes by subscribing to the service type on the remote node. The subscription is received by a Subscription Manager on the remote node and a notification is returned containing the status information for that service type on the remote node. For the duration of that subscription, the Subscription Manager updates the interested party periodically or when a significant event occurs with the Service Provider status information. Subscriptions must be renewed by the interested party, which acts effectively as a heartbeating mechanism for the subscriptions to prevent stale subscriptions.

Either after gathering status information for all the nodes or after some short timeout, the status information is entered into the status table. The Routing Engine now produces a set of bindings and routing regime for the Binding Manager. The Proxy is now able to forward the request based on the updated Binding Manager state. If the routing regime requires it, the Proxy will consult the Routing Engine for a route specific to that invocation. The exact routing regime is determined algorithmically by the Routing Engine based on the status of the available nodes, the latency for those nodes, and the type of invocation.

At this point, the target address is "nodal" specifying the next destination as "type@node", where the node was determined via a collaborative research and discovery effort, where information was gathered by the Status and Availability Manager, analyzed by the Routing Engine, and entered into the Binding Manager.

After using the regime to determine which of the bindings to use, the Proxy forwards the request on to those nodes potentially forking the request to more than one node. The remote nodes receive the request then consult the Status and Availability Manager to determine if there are local instances of the Service Provider available. Of those available instances, the Binding Manager or Routing Engine is again consulted to determine which of the instances is utilized for the particular request.

It is important to note that this invocation of the Routing Engine logic is now at the instance level, whereas the routing algorithm previously applied to the invocation at the service access point was at the node level. This has the implication that fault tolerance, and load distributions are achieved at both the nodal level and the instance level.

Once an instance is discovered, the request is delivered to that Service Provider by the Proxy. At this point, the target address is "instance-based", specifying the next destination as "sp@location", where the exact service provider is known and the exact location is determined by the Routing Engine, analyzing all available local nodes.

The Service Provider returns the response to the Proxy synchronously or asynchronously dependent on the means of communication through which the provider was invoked (though it will appear to the Proxy as asynchronous because of the protocol buffer described earlier).

The Proxy adds status information to the response trailer and then returns the response to the node from which it came. The status information is "peeled off" the response and the status table is updated by the Status and Availability Manager. The response is then delivered directly to the requester by the Proxy.

As a byproduct of the invocation operation described above, the Status and Availability Manager of the service access point is subscribed to the status information for a set of nodes providing a particular type of service. The Routing Engine can then continually analyze the availability and status of all the available services, both remote and local, and keep the Binding Manager up-to-date with a preferenced list of bindings and appropriate routing regimes.

Provisional responses and timeouts will make the operations just described more robust.

When a node receives an invocation, a provisional response is returned to the sender indicating that the message was received. If a node currently has an instance of the requested service registered, a second provisional response is returned to indicate that the node does indeed provide that service currently, otherwise a final response is returned to the node indicating that the service is temporarily unavailable. Other provisional responses can be sent, at the request of the Service Provider, to indicate various stages of request processing.

Timeouts are used both as a heartbeating mechanism and a means through which the system provides guaranteed delivery. Each node stores the request, until it receives acknowledgement that the request was in fact received by the destination.

Provisional and timeout responses are taking advantage of the asynchronous nature of the protocol used by routing fabric, where a single request can generate multiple responses. This can be seen below, in a detailed description of the flow of an invocation both from the perspective of inter-nodal routing fabric and the lower level component interactions.

Figure 5:
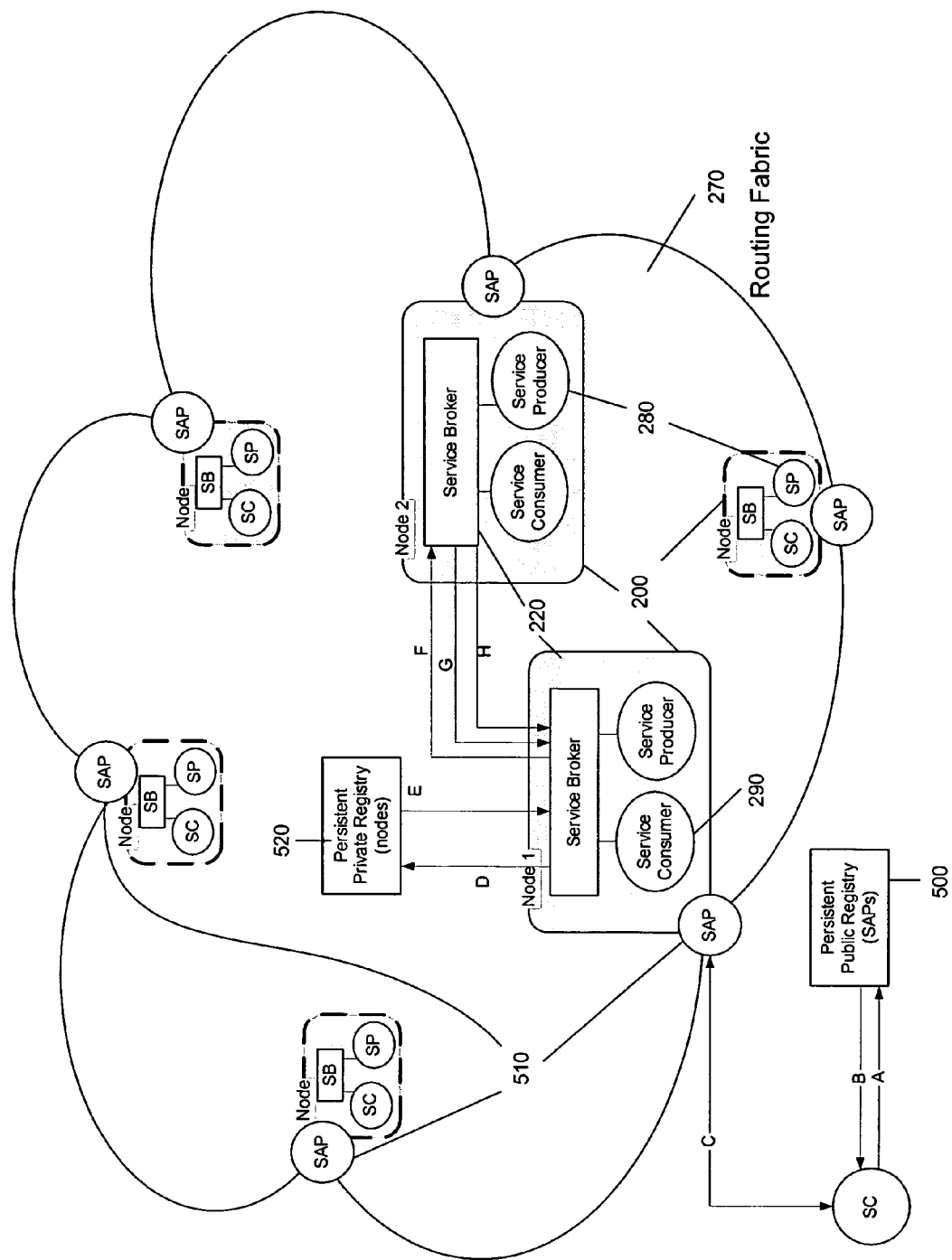
FIG. 5 shows detailed inter-nodal interaction and operations.
Figure 6:
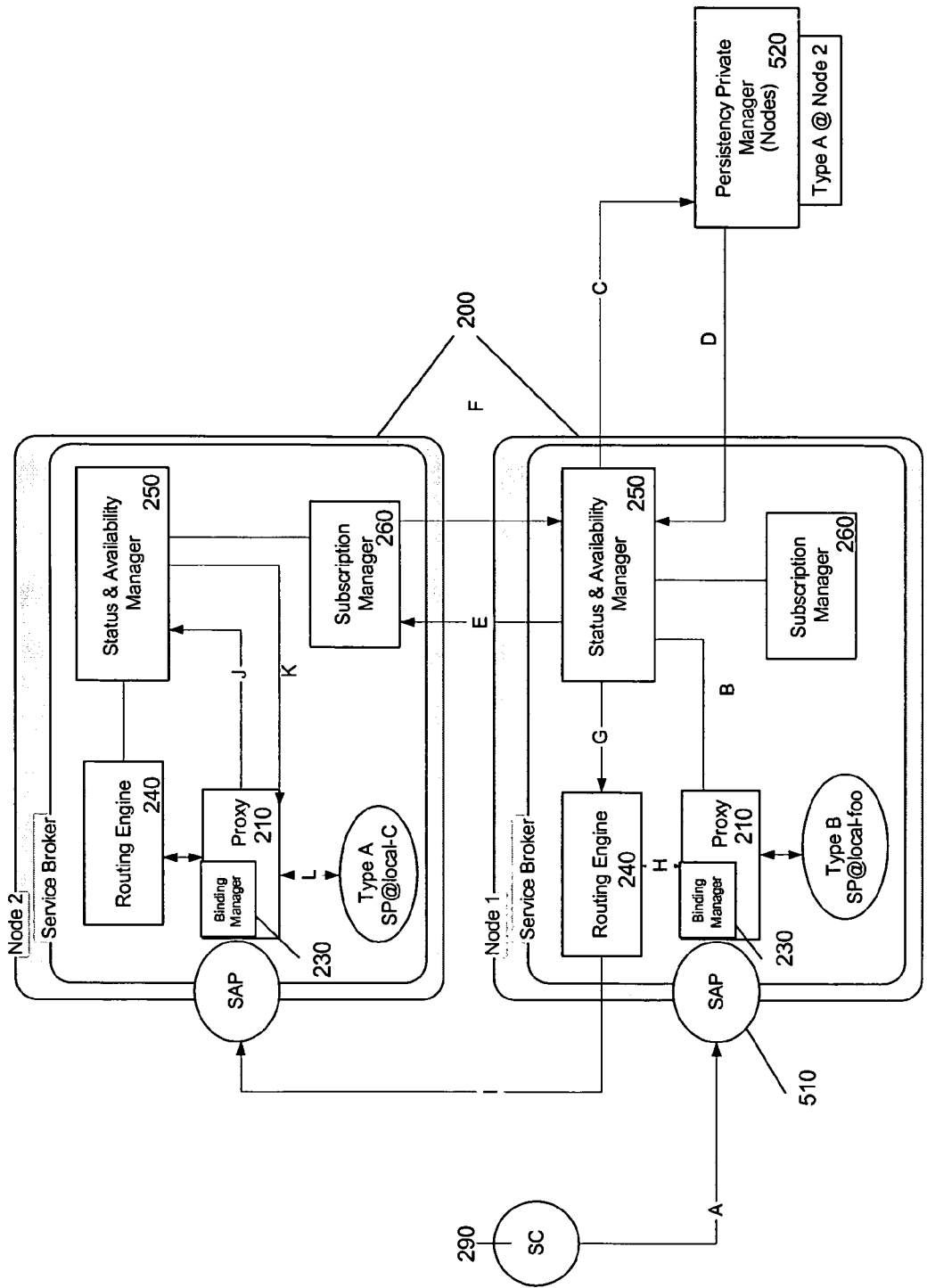
FIG. 6 shows detailed interactions and operations within a pair of communicating nodes.

Consistent with the foregoing description of the preferred embodiment, FIG. 5 shows as a detailed flowchart the set of operations and interactions that occur during an invocation, from an inter-nodal perspective. Specifically, FIG. 5 shows the detailed communication that takes place between the components of the Service Broker 220 during an invocation, both within a single Service Broker Node and between multiple Service Broker Nodes 200.

A. An exemplary Service Consumer 290 first queries the Persistent Public Registry 500 for the Service Access Point based on the type of service it is trying to invoke.

B. The Persistent Public Registry 500 returns a service access point (SAP) to the Service Consumer 290, possibly based on some location information. The registry may in fact return multiple SAPs. Each of the SAPs might support a different transport mechanism.

C. Using a suitable SAP that it retrieved from the registry, the Service Consumer 290 makes a request of the routing fabric 270 by type. Depending on the SAP used, this may be a synchronous or asynchronous request.

D. Each SAP 510 is associated with a Service Broker Node 200. Assuming the Service Broker Node 200 does not provide the type of service being requested, and assuming it has no binding in the Binding Manager, it requests from the Persistent Private Registry 520, the subset of Service Broker Nodes that provide the requested service type.

E. The Persistent Private Registry 520 returns the appropriate subset of Service Broker Nodes that provide the requested service type.

F. After some intelligent gathering of information regarding this subset of Service Broker Nodes, described below, the request is forwarded to a target one of the subset of Service Broker Nodes, using a fabric routing protocol like SIP.

G. The target Service Broker Node then sends one or more provisional responses back to the querying Service Broker Node, while it forwards the request on to a locally connected Service Provider 280.

H. Then, a final response would be returned to the querying Service Broker Node with additional status information, all of which would eventually be returned to the Service Consumer 280.

FIG. 5 shows in detailed flowchart form the Public Persistent Registry and Private Persistent Registry in relation to the Fabric, as practiced in the preferred embodiment.

A. The Service Consumer 290 makes a request by type via a Service Access Point 510 using one of a set of supported protocols that may be synchronous or asynchronous.

B. The Proxy 210 receives that invocation and in the case that its Binding Manager 230 does not already have a binding for that service type, Proxy 210 tells the Status and Availability Manager 250 to research the requested service type.

C. The Status and Availability Manager 250 asks the Persistent Private Registry 520 which Service Broker Nodes provide the requested service.

D. The Persistent Private Registry 520 identifies to the Status and Availability Manager 250 those Service Broker Nodes 200 that support the requested service type.

E. The Status and Availability Manager 250 then collects information about a set of Service Broker Nodes 200.

F. The Subscription Manager 260 sends a notification containing the aggregate status information of all the local providers registered with its node.

G. The Status and Availability Manager 250 then informs the Routing Engine 240 that there has been an update to the status information regarding a particular requested service type.

H. The Routing Engine 240 interrogates the statuses and determines the proper binding and regime to add to the Binding Manager 230.

I. Once the bindings have been updated in the Binding Manager 230, the Proxy 210 routes the invocation on to a target Service Broker Node 200 using a fabric protocol.

J. When the target Service Broker Node 200 receives the request, it queries its Status and Availability Manager by type for all the available instances.

K. The Status and Availability Manager 250 then returns to the Proxy 210 a list of the instances that support the requested service type and their locations.

L. The Proxy 210 uses the Routing Engine 240 to determine which instance to use and finally performs the invocation.

In the system and methods of the present invention, all responses return via the same route as the request traversed and they are annotated as they return. The consumer can then optimize the route for subsequent invocations by sending the request directly to the instance or directly to the node that is managing the provider bypassing the service access point.

Operations within a single node still occur even if the system is not servicing requests. The majority of those in-node operations support the intelligent routing decisions involved when the next request is serviced. More specifically, these "idle operations" support distributed load balancing and fault tolerance.

The idle operations are:
Status Notifications
Local Service Provider Heartbeating Local Service Provider Heartbeating ensures that the Status and Availability Manager is kept up-to-date with the statuses of its local service providers. The payload of a heartbeat includes the status of the service provider. Each heartbeat has a time-to-live. If a heart-beat is not received, the service provider's registration expires.

The Subscription Manager then distributes those status updates to other interested nodes. The other nodes registered their interest when they received an invocation of a type for which they had no service provider. Specifically, the Service Status and Availability Manager subscribes to the set of nodes, which was returned by the Persistent Private Registry. Once subscribed, the Status and Availability Manager is periodically updated with the status information for those nodes. This information is then fed back into the Routing Engine, which alters bindings and regimes based on the updated information.

The combination of a local service provider heartbeating and notifications to disseminate status information to other nodes ensures that within an entire network of Service Application Points every Service Status and Availability Manager is always up-to-date with not only the status information of all its local service providers but also the status information for all the remote nodes providing services of types for which the local node is being used as an access point.

Given this information, the affiliated Routing Engine can make intelligent decisions regarding which bindings to choose, which nodes to forward requests to, and what regime to use when making that decision. Example regimes would be sticky—where the same node/instance is used for each request—or round robin—where requests are evenly distributed among a set of bindings. Applying a regime to a set of bindings achieves load balancing.

Besides the periodic notifications and heartbeating, a timeout might also cause a status update. If the proxy receives a timeout, it decommissions a service provider removing its binding in the binding manager to ensure that further requests are not sent to that instance. Not until the Status and Availability Manager receives a status notification indicating renewed availability of the decommissioned service provider does that service provider's binding get added again to the binding manager.

The naïve traditional implementation of a service oriented architecture where systems are statically bound to one another does not provide the flexibility required in an environment where the availability and location of service providers can not be assumed. The invention introduces multiple-levels of abstraction, which can then be leverage to achieve capabilities not found in current "static" implementations of web services, which includes distributed load balancing and fault tolerance.

shows the detailed communication that takes place between the components of the service broker during an invocation, both within a single node and the between nodes.

While this invention has been particularly described with reference to several and preferred embodiments, those of skill in the art will recognize that changes to the embodiments may be made without departing from the spirit and scope of the present invention.

We claim:

1. A method for routing data among endpoints in a distributed network comprising:
   receiving, in a service access point, a request for a service of a requested service type from a service consumer;
   determining, in a proxy corresponding to the service access point, whether a pre-existing binding exists between the service consumer and a plurality of nodes of the requested service type;
   if the determining indicates that a pre-existing binding exists:
      selecting a target node from the plurality of nodes; and
      establishing a communication route directly between the target node and the service consumer, wherein a service broker is bypassed by the communication route;
   if the determining indicates that no pre-existing binding exists:
      querying a private persistent registry corresponding to the service broker to obtain a list of nodes from the plurality of nodes providing service of said particular service type;
      collecting, in the service broker, status and routing information for the nodes comprising the list of nodes;
      creating a plurality of bindings between the nodes comprising the list of nodes and the requested service type in a binding cache accessible to the proxy;
      analyzing the status and routing information to identify a node from the list of nodes as the target node; and
      establishing a communication route between the target node and the service consumer through the service broker.

2. The method according to claim 1, wherein the target node comprises a plurality of instances providing the service of the requested service type.

3. The method according to claim 2, wherein establishing a communication route between the target node and the service consumer comprises:
   selecting an instance from the plurality of instances comprising the target node as a service provider; and
   establishing a communication route between the service consumer and the service provider.

4. The method according to claim 3, wherein collecting status and routing information for the nodes comprising the list of nodes comprises collecting status information for the plurality of instances comprising the target node.

5. The method according to claim 4, wherein selecting an instance from the plurality of instances comprising the target node as a service provider comprises analyzing the status information of the plurality of instances and selecting an instance as the service provider based on the status information of the plurality of instances.

6. The method according to claim 5, wherein selecting an instance as the service provider based on the status information of the plurality of instances comprises applying a routing regime among the plurality of instances.

7. The method according to claim 6, wherein applying a routing regime among the plurality of instances comprises performing load-balancing of service requests among the plurality of instances.

8. The method according to claim 6, wherein applying a routing regime among the plurality of instances comprises distributing service requests among the plurality of instances according to a round robin selection.

9. The method according to claim 3, wherein subsequent requests for service of the requested service type from the service consumer are transmitted directly to the service provider and bypass the service broker.

10. The method according to claim 1, further comprising:
    querying the service consumer to select between receiving service of the requested service type from the service provider or determining a second service provider for subsequent requests for service of the requested service type from the service consumer;
    selecting a second node from the plurality of nodes as a new target node, the new target node corresponding to a binding with the requested service type; and
    establishing a communication route between the new target node and the service consumer.

11. The method according to claim 10, wherein selecting a second node from the plurality of nodes as a new target node comprises:
selecting an instance from the plurality of instances comprising the new target node as the new service provider; and
establishing a communication route between the service consumer and the new service provider.

12. The method according to claim 1, wherein selecting a target node from the plurality of nodes if the determining indicates that a pre-existing binding exists comprises selecting a target node from the plurality of nodes based on status and routing information of the plurality of nodes collected in the proxy.

13. The method according to claim 12, wherein creating a plurality of bindings between the nodes comprising the list of nodes and the requested service type in the proxy comprises establishing, in the proxy, a plurality of subscriptions with the nodes comprising the list of nodes, each subscription having a duration.

14. The method according to claim 13, wherein for the duration of a subscription of the plurality of subscriptions, the node corresponding to the subscription periodically sends the proxy updated status and routing information.

15. The method according to claim 1, wherein the proxy comprises a routing engine, a binding manager and a status manager.

16. The method according to claim 15, wherein determining whether a pre-existing binding exists is performed by the binding manager in the proxy.

17. The method according to claim 15, wherein selecting a target node from the plurality of nodes if the determining indicates that a pre-existing binding exists is performed by the routing engine in the proxy.

18. The method according to claim 17, wherein selecting a target node from the plurality of nodes if the determining indicates that a pre-existing binding exists is performed by the routing engine by applying a routing regime to the pre-existing binding.

19. The method according to claim 15, wherein status and routing information for the nodes comprising the list of nodes is collected in the status manager.

20. The method according to claim 19, wherein status and routing formation for a node in the list of nodes includes at least one of the following types of data regarding the node: availability; status; and location.

21. The method according to claim 15, wherein creating a plurality of bindings between the nodes comprising the list of nodes and the requested service type comprises creating a plurality of bindings between the nodes comprising the list of nodes and the requested service type in the binding manager of the proxy.

22. The method according to claim 5, wherein the service broker further comprises a subscription manager configured to receive and store subscription requests from other service brokers, and to disseminate status and availability information of a plurality of local, associated service providers.

23. The method according to claim 1, wherein establishing a communication route between the target node and the service consumer comprises exchanging messages according to a session initiation protocol (SIP) between the service consumer and the target node.

24. The method according to claim 1, wherein establishing a communication route between the target node and the service consumer comprises enabling the mutual exchange of messages through a multi-protocol set of communication channels.

25. The method according to claim 24, wherein the multi-protocol set of communications channels comprises a plurality of channels enabling message exchange according to a plurality of data transport protocols, the plurality of data transport protocols comprising asynchronous protocols and synchronous protocols wherein data transport is buffered so as to operate asynchronously.

26. A re-writable non-transitory computer-readable medium comprising processing instructions which, when executed in a computer system, is operable to perform data routing among endpoints in a distributed network, said processing instructions comprising:
instructions to receive, in a service access point, a request for a service of a requested service type from a service consumer;
instructions to determine, in a proxy corresponding to the service access point, whether a pre-existing binding exists between the service consumer and a plurality of nodes of the requested service type;
if the determining indicates that a pre-existing binding exists, instructions to:
select a target node from the plurality of nodes;
establish a communication route directly between the target node and the service consumer, wherein a service broker is bypassed by the communication route;
if the determining indicates that no pre-existing binding exists, instructions to:
perform a query of a private persistent registry corresponding to the service broker to obtain a list of nodes from the plurality of nodes providing service of said particular service type,
collect, in the service broker, status and routing information for the nodes comprising the list of nodes,
create a plurality of bindings between the nodes comprising the list of nodes and the requested service type in a binding cache accessible to the proxy,
analyze the status and routing information to identify a node from the list of nodes as the target node, and
establish a communication route between the target node and the service consumer through the service broker.

27. The computer-readable medium according to claim 26, wherein the target node comprises a plurality of instances providing the service of the requested service type.

28. The computer-readable medium according to claim 27, wherein the instructions to establish a communication route between the target node and the service consumer comprises:
instructions to select an instance from the plurality of instances comprising the target node as a service provider; and
instructions to establish a communication route between the service consumer and the service provider.

29. The computer-readable medium according to claim 28, wherein the instructions to collect status and routing information for the nodes comprising the list of nodes comprises instructions to collect status information for the plurality of instances comprising the target node.

30. The computer-readable medium according to claim 29, wherein the instructions to select an instance from the plurality of instances comprising the target node as a service provider comprises instructions to analyze the status information of the plurality of instances and select an instance as the service provider based on the status information of the plurality of instances.

31. The computer-readable medium according to claim 30, wherein the instructions to select an instance as the service provider based on the status information of the plurality of instances comprises instructions to apply a routing regime among the plurality of instances.

32. The computer-readable medium according to claim 31, wherein instructions to apply a routing regime among the plurality of instances comprises instructions to perform load-balancing of service requests among the plurality of instances.

33. The computer-readable medium according to claim 31, wherein instructions to apply a routing regime among the plurality of instances comprises instructions to distribute service requests among the plurality of instances according to a round robin selection.

34. The computer-readable medium according to claim 28, wherein subsequent requests for service of the requested service type from the service consumer are transmitted directly to the service provider and bypass the service broker.

35. The computer-readable medium according to claim 26, further comprising:
  instructions to query the service consumer to select between receiving service of the requested service type from the service provider or determining a second service provider for subsequent requests for service of the requested service type from the service consumer;
  instructions to select a second node from the plurality of nodes as a new target node, the new target node corresponding to a binding with the requested service type; and
  instructions to establish a communication route between the new target node and the service consumer.

36. The computer-readable medium according to claim 35, wherein the instructions to select a second node from the plurality of nodes as a new target node comprises:
  instructions to select an instance from the plurality of instances comprising the new target node as the new service provider; and
  instructions to establish a communication route between the service consumer and the new service provider.

37. The computer-readable medium according to claim 26, wherein the instructions to select a target node from the plurality of nodes if the determining indicates that a pre-existing binding exists comprises instructions to select a target node from the plurality of nodes based on status and routing information of the plurality of nodes collected in the proxy.

38. The computer-readable medium according to claim 37, wherein instructions to create a plurality of bindings between the nodes comprising the list of nodes and the requested service type in the proxy comprises instructions to establish, in the proxy, a plurality of subscriptions with the nodes comprising the list of nodes, each subscription having a duration.

39. The computer-readable medium according to claim 38, wherein for the duration of a subscription of the plurality of subscriptions, the node corresponding to the subscription periodically sends the proxy updated status and routing information.

40. The computer-readable medium according to claim 26, wherein instructions to establish a communication route between the target node and the service consumer comprises instructions to exchange messages according to a session initiation protocol (SIP) between the service consumer and the target node.

41. The computer-readable medium according to claim 26, wherein instructions to establish a communication route between the target node and the service consumer comprises instructions to enable the mutual exchange of messages through a multi-protocol set of communication channels.

42. The computer-readable medium according to claim 41, wherein the multi-protocol set of communications channels comprises a plurality of channels enabling message exchange according to a plurality of data transport protocols, the plurality of data transport protocols comprising asynchronous protocols and synchronous protocols wherein data transport is buffered so as to operate asynchronously.

43. The method according to claim 1, wherein establishing a communication route directly between the target node and the service consumer comprises swapping a message header corresponding to the service request to replace interim address information comprised in the message header with a final destination address information corresponding to the target node.

44. The computer readable medium according to 26, wherein the instructions to establish a communication route directly between the target node and the service consumer comprises instructions to swap a message header corresponding to the service request to replace interim address information comprised in the message header with a final destination address information corresponding to the target node.

* * * * *